(12) United States Patent
Amro et al.

(10) Patent No.: US 6,324,500 B1
(45) Date of Patent: Nov. 27, 2001

(54) METHOD AND SYSTEM FOR THE INTERNATIONAL SUPPORT OF INTERNET WEB PAGES

(75) Inventors: Hatim Yousef Amro, Austin; John Paul Dodson, Pflugerville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/971,017

(22) Filed: Nov. 14, 1997

(51) Int. Cl.[7] .............................. G06F 17/20; G06T 11/00
(52) U.S. Cl. ............................................. 704/8; 345/467
(58) Field of Search ..................... 704/8, 1, 9; 707/535, 707/536, 542; 382/185, 329, 330, 331; 345/171, 141, 467; 389/259

(56) References Cited

U.S. PATENT DOCUMENTS

| 4,684,926 | * | 8/1987 | Yong-min | 707/535 |
| 4,937,745 | * | 6/1990 | Carmon | 707/535 |
| 5,586,198 | * | 12/1996 | Lakritz | 382/185 |
| 5,884,014 | * | 3/1999 | Huttenlocher et al. | 395/114 |
| 5,892,843 | * | 4/1999 | Zhou et al. | 383/176 |
| 5,959,635 | * | 9/1999 | Watanabe et al. | 345/469 |
| 6,054,998 | * | 4/2000 | Miyauchi | 345/467 |
| 6,073,148 | * | 6/2000 | Rowe et al. | 707/542 |

FOREIGN PATENT DOCUMENTS

| 61-129685 | | 6/1986 | (JP) . |
| 4-68638 | | 3/1992 | (JP) . |
| 4-147319 | | 5/1992 | (JP) . |
| 10149354 | * | 11/1996 | (JP) | G06F/17/21 |

* cited by examiner

Primary Examiner—Patrick N. Edouard
(74) Attorney, Agent, or Firm—Leslie A. Van Leeuwen; Bracewell & Patterson, L.L.P.

(57) ABSTRACT

A method and system in a computer network for the dynamic conversion of foreign language data transferred from a remote network site to a local network site into data supportive of the foreign language data, such that the data supportive of the foreign language data may be displayed at the local network site. Initially, the foreign language data at the remote network site is scanned, and individual foreign language characters are associated with the foreign language data. Next, each individual foreign language character associated with the foreign language data is mapped to a position in a table of characters capable of being transferred as data to another network site. The table and the mapping information are then transferred as data to the local network site. The characters contained in the table are subsequently automatically converted at the local network site into foreign language data. Finally, the foreign language data is displayed at the local network site.

11 Claims, 6 Drawing Sheets

METHOD AND SYSTEM FOR THE INTERNATIONAL SUPPORT OF INTERNET WEB PAGES

BACKGROUND OF THE INVENTION

1. Technical Field

The present invention relates to improved information-retrieval methods and systems. In particular, the present invention relates to improved information-retrieval methods and systems utilized in association with graphical user interfaces. The present invention particularly relates to Internet-based information-retrieval methods and systems. More particularly, the present invention relates to symbolic and character set support for Internet-based information-retrieval systems. Still more particularly, the present invention relates to international linguistic support for Internet-based information-retrieval systems.

2. Description of the Related Art

The development of computerized information resources, such as remote networks, allow users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television.

In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery.

One type of remote network commonly utilized in recent years is the Internet. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Electronic information transferred between data-processing networks is usually presented in hypertext, a metaphor for presenting information in a manner in which text, images, sounds, and actions become linked together in complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination thereof into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to move back to "original" or referring network sites by the mere "click" (i.e., with a mouse or other pointing device) of the hyper-linked topic.

A typical networked system that utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. In a client/server architecture, particularly a networked system, a client is usually a computer that accesses shared network resources provided by another computer (i.e., a server).

A request by a user for news can be sent by a client application program to a server. A server is typically a remote computer system accessible over a remote network such as the Internet. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by Hypertext-Transfer Protocol (HTTP). The World Wide Web (WWW) or, simply, the "web," includes those servers adhering to this standard (i.e., HTTP) which are accessible to clients via a computer or data-processing system network address such as a Universal Resource Locator (URL). The network address can be referred to as a Universal Resource Locator address. For example, communication can be provided over a communications medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to "web pages" constructed from a Hypertext Markup Language (HTML), or other server-generated data. Each web page can also be referred to simply as a "page."

The client and server typically display browsers and other remote network data for a user via a graphical user interface. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., Universal Resource Locator). The Universal Resource Locator address has two basic components, the protocol to be used and the object pathname. For example, the Universal Resource Locator address, "http://www.uspto.gov" (i.e., home page for the U.S. Patent and Trademark Office), specifies a hypertext-transfer protocol ("http") and a pathname of the server ("www.uspto.gov"). The server name is associated with a unique numeric value (TCP/IP address).

The evolution of personal computers over the last decade has accelerated the web and Internet toward useful everyday applications. Nearly every computer sold over the last several years has or will, at some point, become "on-line" to an Internet service provider. Somewhere between 20 and 30 million people around the globe use some form of Internet service on a regular basis. The graphical portion of the World Wide Web itself is usually stocked with more than twenty-two million "pages" of content, with over one million new pages added every month.

Free or relatively inexpensive computer software applications such as Internet "search engines" make it simple to track down sites where an individual can obtain information on a topic of interest. A person may type in a subject or key word and generate a list of network sites (i.e., web sites). Thus, with "home pages" published by thousands of companies, universities, government agencies, museums, and municipalities, the Internet can be an invaluable resource. With a little practice, even new users can skim millions of web pages or thousands of newsgroups, not only for topics of general interest, but also to access precise bits of data. The market for Internet access and related applications is explosive and is growing faster than expected, doubling in size approximately every three months.

A problem associated with the Internet is the dichotomy that exists between web sites or web pages in one particular language and users who speak other languages. Because the Internet has become a truly international communications medium and is becoming even more so over time, the resulting confusion of languages poses problems in spreading information throughout the globe over the Internet. For example, a newspaper web page displayed in Arabic characters in Jordan may not be successfully displayed in the United States because the American browser probably does not support the display of Arabic characters. Native Language support (NLS) must be built into the browser software itself. Most browsers are not currently programmed to provide NLS support for most of the languages that span the globe.

A current technique available to directly support international web page languages is to alter the browser itself, which is an expensive and difficult process, particularly to the average computer user, or to display the foreign language as graphical data (e.g., MPEG) at a remote network site and then transfer and display this graphical data at the local network site. In such a case, a user is unable to utilize this data in other capacities. For example, the user may not "copy" and "paste" such graphical data to other applications such as word processing programs in the same manner as textual data displayed on a web page. In addition, such graphic formats are memory intensive and slow.

Based on the foregoing, one can appreciate that a need exists for a method and system that would allow standard browsers to display foreign language data distributed over the World Wide Web without actively altering the browser software itself or providing expensive hardware and software additions to support such browser software. Such an advance can be achieved, according to the disclosure provided herein, by providing an encryption-decryption method and system that is coupled directly to encrypted data.

SUMMARY OF THE INVENTION

It is therefore an object of the invention to provide an improved information-retrieval method and system.

It is another object of the present invention to provide improved information-retrieval methods and systems utilized in association with graphical user interfaces.

It is yet another object of the present invention to provide Internet-based information-retrieval methods and systems.

It is a further object of the present invention to provide symbolic and character set support for Internet-based information-retrieval systems It is still another object of the present invention to provide international linguistic support for Internet-based information-retrieval systems.

The above and other objects are achieved as is now described. A method and system in a computer network are disclosed for the dynamic conversion of foreign language data transferred from a remote network site to a local network site into data supportive of the foreign language data, such that the data supportive of the foreign language data may be displayed at the local network site. Initially, the foreign language data at the remote network site is scanned, and individual foreign language characters are associated with the foreign language data.

Next each individual foreign language character associated with the foreign language data is mapped to a position in a table of characters capable of being transferred as data to another network site. The table and the mapping information are then transferred as data to the local network site. The characters contained in the table are subsequently automatically converted at the local network site into foreign language data. Finally, the foreign language data is displayed at the local network site.

The table comprises an encryption/decryption table. The foreign language textual data and the encrypted data are then both transferred to the local browser. The table contains a mapping of all unique characters or symbols within the data and their associated key values. The data to be encrypted is encrypted as a sequence of keys. Thereafter, during display at the local network site (i.e., local browser), table look-up occurs such that the table look-up includes the operation of reading the sequence of keys (i.e., the encrypted data) and displaying a "made-up" font associated with that key.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DESCRIPTION OF PREFERRED EMBODIMENT

Figure 1:
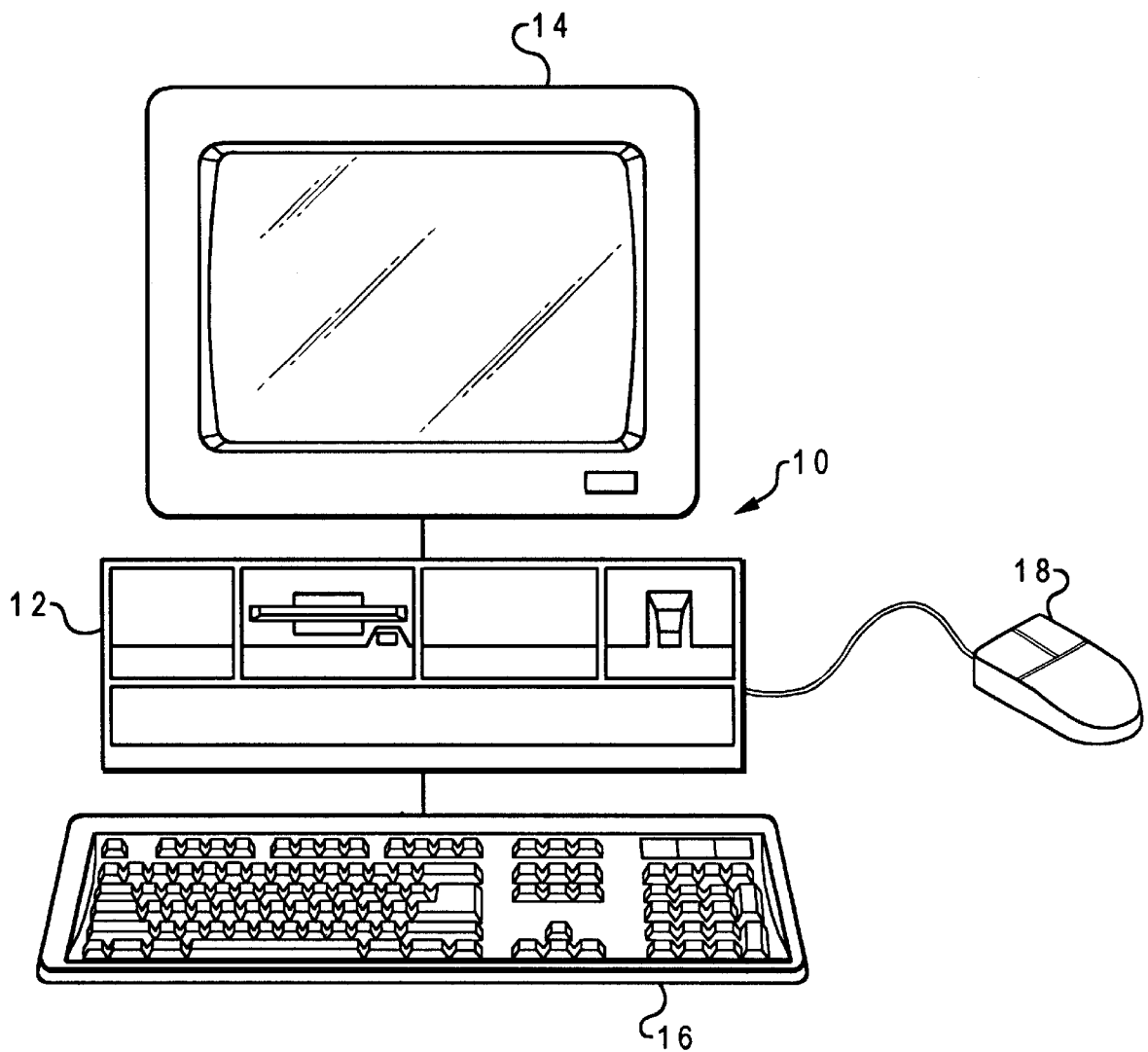
FIG. 1 is a pictorial representation of a data-processing system which can be utilized to implement the method and system of the present invention.

With reference now to the figures and, in particular, with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown), such as a trackball or stylus, also can be included with personal computer 10. Computer 10 can be implemented utilizing any suitable computer, such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 also can be implemented utilizing any suitable computer, such as the IBM RISC/6000 computer, a product of International Business Machines Corporation, located in Armonk, N.Y. "RISC SYSTEM/6000" is a trademark of International Business Machines Corporation, and also can be referred to as the "RS/6000."

Figure 2:
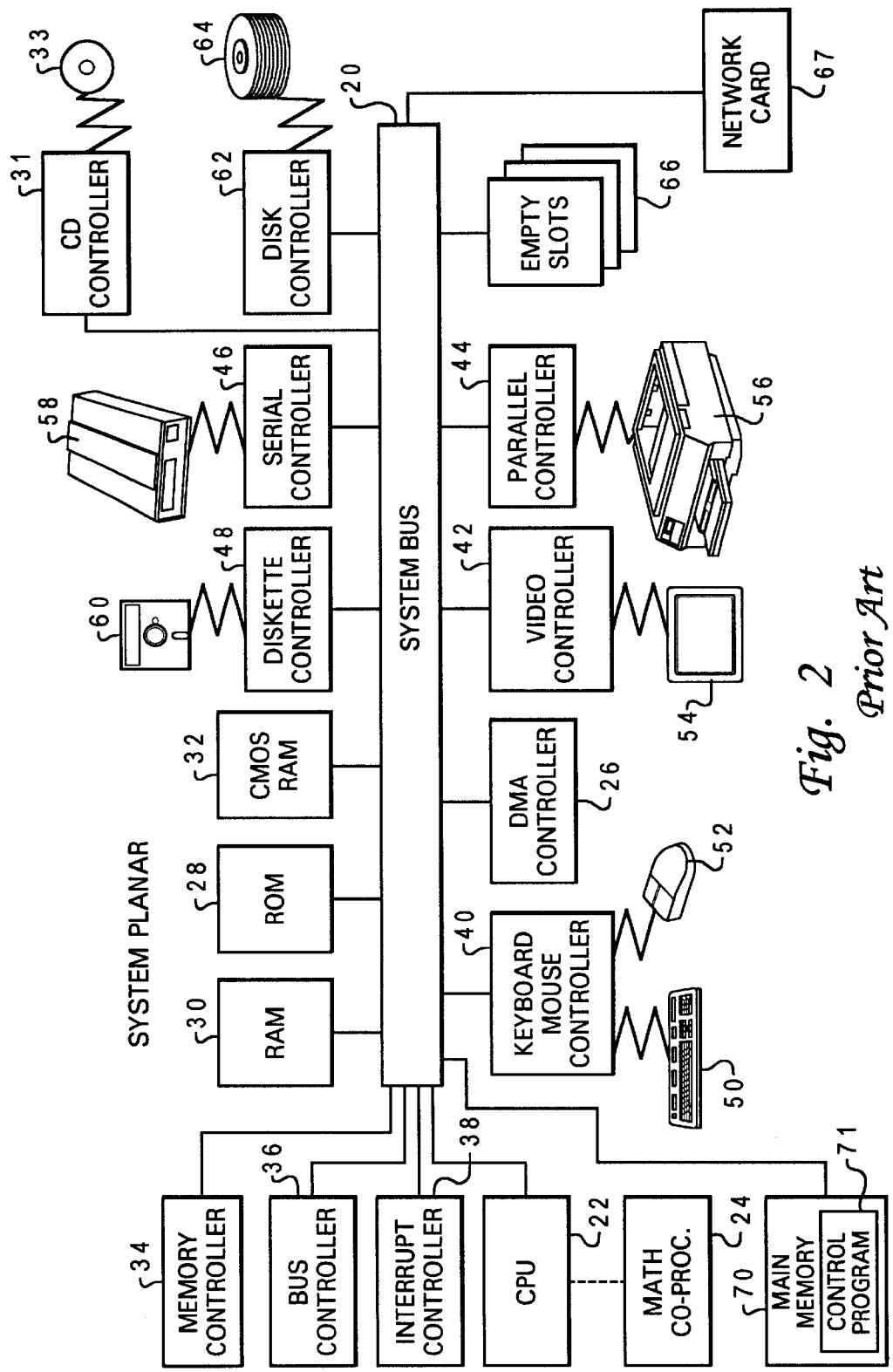
FIG. 2 depicts a block diagram illustrative of selected components in a personal computer system which can be utilized to implement the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 also is connected to system bus 20 and allows various devices to appropriate cycles from CPU 22 during large input/output ("I/O") transfers. Read-only memory ("ROM") 28 and random-access memory ("RAM") 30 are also connected to system bus 20. ROM 28 is mapped into the microprocessor 22 address space in the range from 640K to 1 megabyte. CMOS RAM 32 is attached to system bus 20 and contains system-configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers, such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices, such as printer 56. Serial controller 46 provides a hardware interface for devices, such as a modem 58. Diskette controller 48 provides a hardware interface for floppy-disk unit 60. Other technologies also can be utilized in conjunction with CPU 22, such as touch-screen technology or human voice control.

Main memory 70 is connected to system bus 20, and includes a control program 71. Control program 71 resides within main memory 70 and contains instructions that when executed on CPU 22 carry out the operations depicted in the logic flowchart of FIG. 7 described herein. The computer program product also can be referred to as a program product. Control program 71 can support a number of Internet-access tools including, for example, an HTTP-compliant web "browser." Known browser software applications include: Netscape Navigator® ("Netscape") Mosaic, and the like. Netscape, in particular, provides the functionality specified under HTTP. "Netscape" is a trademark of Netscape, Inc. Mosaic-brand browser is available from the National Center for Supercomputing Applications (NCSA) in Urbana-Champaign, Ill. The present invention is designed to operate with any of these known or developing web browsers, in order to provide network navigation aids for web pages displayed with three-dimensional graphics.

Control program 71 also can support other remote network services, such as the file-transfer protocol (FTP) service, which facilitates the transfer and sharing of files across remote networks such as the Internet. Control program 71 can further support remote network services, such as remote terminal access (Telnet), which allows users to log onto computers coupled to the network. In addition, control program 71 additionally can support services, such as simple mail-transfer protocol (SMTP) or e-mail, and network news-transfer protocol (NNTP) or "Usenet," well-known in the art of computer networking.

It is important to note that, while the present invention has been (and will continue to be) described in the context of a fully functional computer system, those skilled in the art can appreciate that the present invention is capable of being distributed as a program product in a variety of forms and that the present invention applies equally regardless of the particular type of signal-bearing media utilized to actually carry out the distribution. Examples of signal-bearing media include: recordable-type media, such as floppy discs, hard-disk drives, audio CDs and CD ROMs, and transmission-type media, such as digital and analog communication links. FIG. 2 additionally depicts a CD controller 31 for controlling a CD system 33. CD system 33 may run audio CDs or CD-ROMs, both well known in the art of digital electronic media. CD system 33 is a sound or data reproduction system that utilizes light to detect audio and data signals produced by digital recording on a CD.

Expansion cards also may be added to system bus 20, such as disk controller 62, which provides a hardware interface for hard-disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture or to groups of computers and associated devices which are connected by communications facilities.

Those skilled in the art will appreciate that the hardware depicted in FIG. 2 may vary for specific applications. For example, other peripheral devices, such as: optical-disk media, audio adapters, or chip-programming devices, such as PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
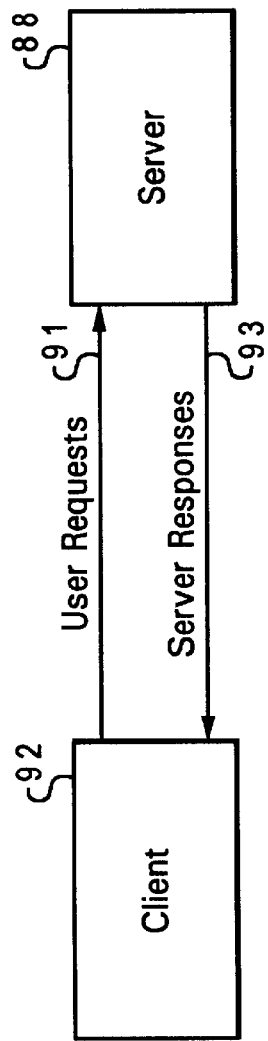
FIG. 3 illustrates a block diagram illustrative of a client/server architecture which can be utilized to implement the method and system of the present invention.
Figure 4:
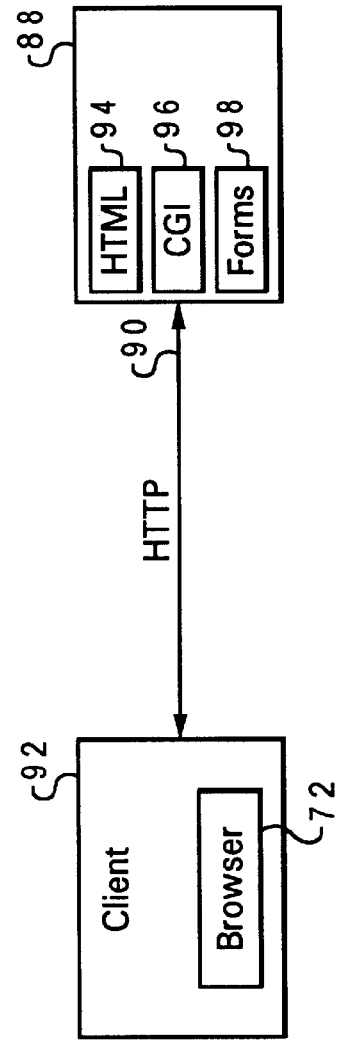
FIG. 4 depicts a detailed block diagram illustrative of a client/server architecture which can be utilized to implement the method and system of the present invention.
Figure 5:
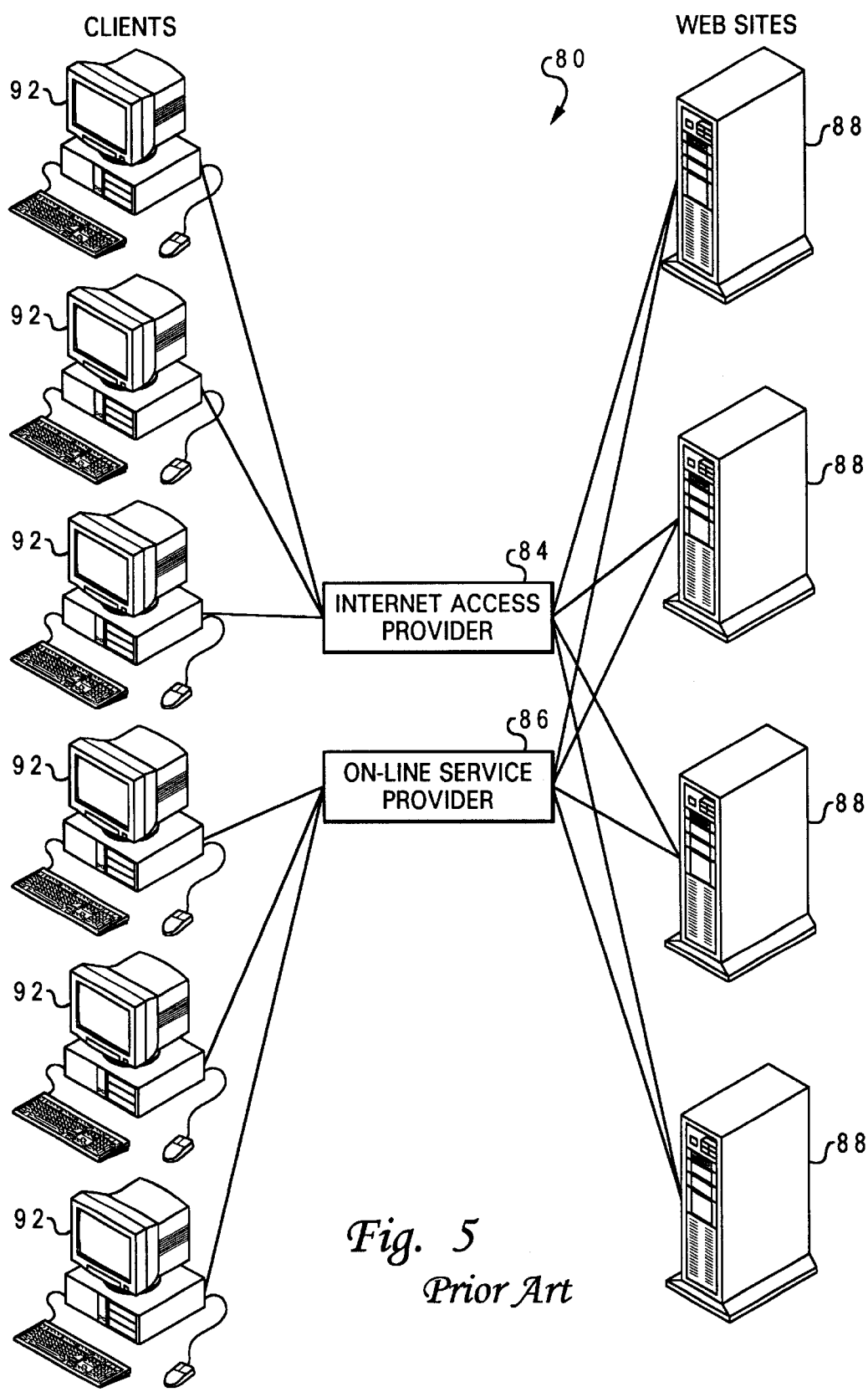
FIG. 5 is a diagram illustrative of a computer network which can be implemented in accordance with the method and system of the present invention.

In FIG. 3, FIG. 4, and FIG. 5, like parts are indicated by like reference numbers. FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over a remote network such as the Internet. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system and communicate with the first computer system over a communications medium, thus providing distributed functionality and allowing multiple clients to take advantage of the information-gathering capabilities of the server.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by HTTP. Active within client 92 is a first process, browser 72, which establishes the connections with server 88, and presents information to the user. Such browsers are often referred to in the art of computer networking as "web browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser, or the Lynx-brand browsers or others which are available and provide the functionality specified under HTTP can be utilized with the present invention.

Server 88 executes the corresponding server software which presents information to the client in the form of HTTP responses 90. The HTTP responses 90 correspond with web "pages," which can be represented by utilizing Hypertext Markup Language (HTML), or other data generated by server 88. For example, under the Mosaic-brand browser, in addition to HTML functionality 94 provided by server 88, a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion. Common Gateway Interlace (CGI) 96 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic brand browser described herein. This functionality allows the user via a client application program to specify terms in which the server causes an application program to function (e.g., terms or keywords contained in the types of stories/articles which are of interest to the user).

FIG. 5 is a diagram illustrative of a computer network 80 which can be implemented in accordance with the method and system of the present invention. Computer network 80 is representative of a remote network, specifically the Internet, a known computer network based on the client-server model discussed earlier. Conceptually, the Internet includes a large network of servers 88 which are accessible by clients 92, typically users of personal computers, through some private Internet-access provider 84 (e.g., such as Internet America) or an on-line service provider 86 (e.g., such as America On-Line, Prodigy, Compuserve, and the like). Each of the clients 92 may run a browser, a known software tool utilized to access servers 88 via the access providers 84. Each server 88 operates a web site which supports files in the form of documents and pages. A network path to servers 88 is identified by a Universal Resource Locator having a known syntax for defining a network collection.

Figure 6:
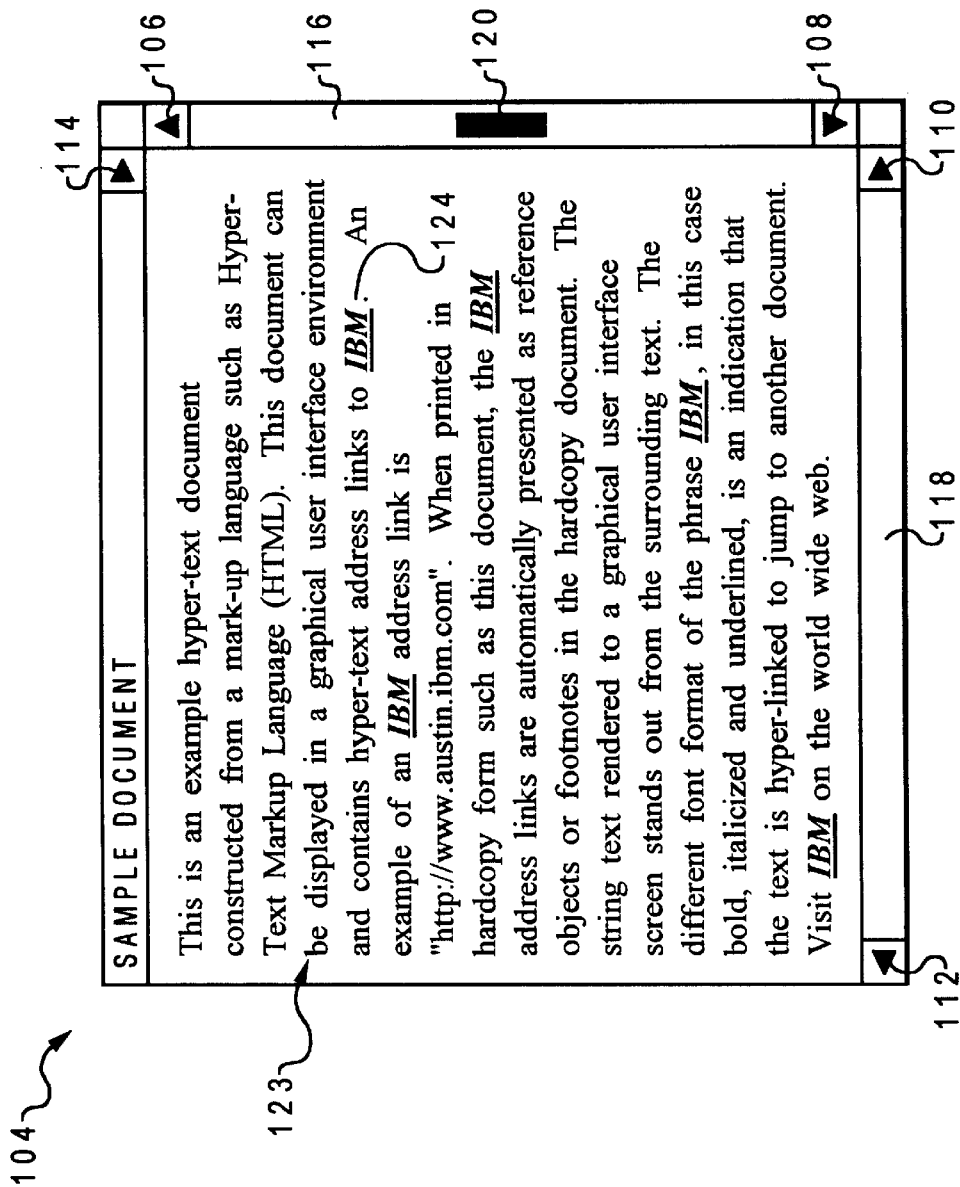
FIG. 6 illustrates a hypertext document contained within a graphical user interface window which can be utilized to implement the method and system of the present invention.

FIG. 6 illustrates an example hypertext document 123 contained within a graphical user interface window 104 which can be utilized in accordance with the method and system of the present invention. Window 104 displays a portion of a hypertext document 123 constructed from a mark-up language, such as HTML. The size and position of elevator 120 within scroll bar 116 corresponds to the size and position of the current viewable page in relation to hypertext document 123. Hypertext document 123 can be accessed from a data-processing system contained within a remote network, such as the Internet.

Those skilled in the art will appreciate that such hypertext documents can be displayed in foreign languages at remote servers. Although hypertext document 123 is depicted written in the English language, such hypertext documents may be displayed in foreign characters. However, as explained herein, such foreign characters are not readily transferred to browsers and remote network sites that do not support such foreign characters. Thus, the present invention provides an encryption method for converting such foreign characters into fonts that may be displayed within browsers that do not ordinarily support the display of such foreign characters.

In the example of FIG. 6, in view of the fact that hypertext document 123 includes too many pages to view simultaneously, the user can position a mouse cursor over up-arrow section 106 or down-arrow section 108 of scroll bar 116 and click a pointing device (e.g., a mouse) to scroll hypertext document 123 upward or downward, as appropriate. A vertical scroll bar 118 includes arrow section 112 and arrow section 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user "clicks" on string text 124 with a mouse or other pointing device, the graphical user interface shifts the presently viewed hypertext document 123 to another hyper-linked document. Those skilled in the art will appreciate that such string text can be included within hypertext documents compiled via foreign characters at foreign network sites. Thus, according to the method and system described herein, such string text (i.e., also referred to as "links") may also be converted from a foreign language remote network site and displayed within a browser at a local network site that does not ordinarily support the display of such foreign language characters.

Figure 7:
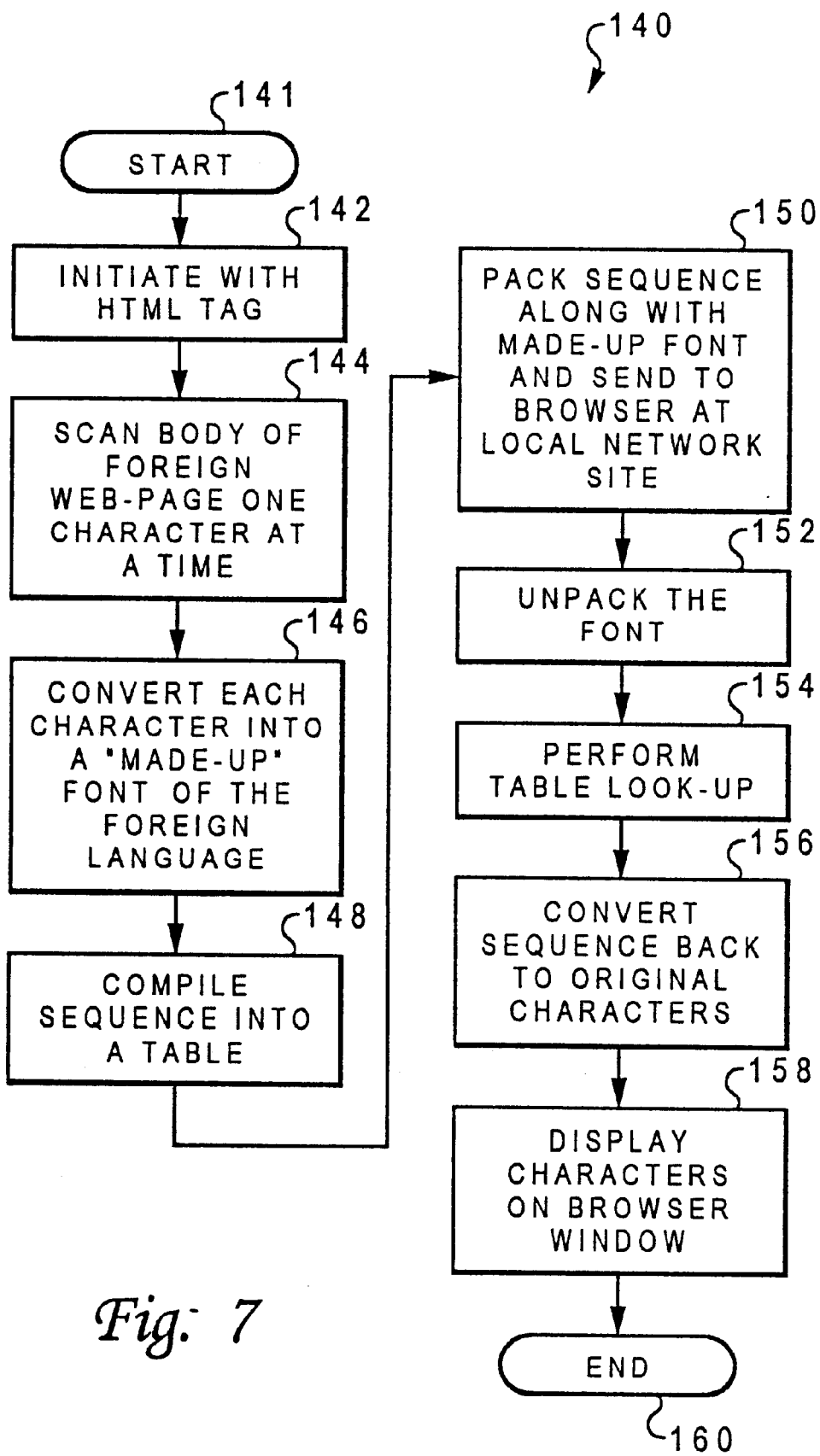
FIG. 7 depicts a flowchart of operations illustrating a method for providing international support for web pages, in accordance with a preferred embodiment of the present invention.

FIG. 7 depicts a flowchart of operations 140 illustrating a method for providing international support for web pages, in accordance with a preferred embodiment of the present invention. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer 10 of FIG. 1 and FIG. 2, in processing electrical or other (e.g. mechanical, chemical) physical signals to generate other desired physical signals.

Thus, as illustrated at block 141, the process described in FIG. 7 begins. As described at block 142, the process is specifically initiated with an HTML tag and operates in a client/server network such as the client/server network described herein. Those skilled in the art will appreciate that although HTML is described in accordance with a preferred embodiment of the present invention, other scripting languages may also be utilized. HTML is thus not a necessary feature of the present invention. An HTML tag is a code that identifies an element in a document, such as a heading or a paragraph, for the purposes of formatting, indexing, and linking information in the document. HTML tags are generally represented textually via a pair of angle brackets which include one or more numbers or letters. Usually one pair of angle brackets is placed after, to indicate where the element begins and ends.

As depicted at block 144, the body of the foreign web page is scanned one character at a time at a remote network site within the client/server network, and then as illustrated at block 146, each character is converted into a "made-up" bit-mapped font representative of the language symbol or character displayed at the remote network site. Bit-mapped fonts are sets of characters in a particular size and style in which each character is described graphically as a unique bit map (i.e., pattern of dots). A bit map is a data structure in computer memory that represents information in the form of a collection of individual bits.

The body of the scanned foreign web page may include foreign language textual characters. Those skilled in the art will of course appreciate that such foreign language textual data may include symbols or characters other than foreign language script (e.g., Arabic script, Russian Cyrillic letters, and so forth), such as mathematical and/or scientific notation. The method and system described herein is meant to encompass more than foreign language text and can handle any potential symbol/character set.

As depicted at block 148, a sequence of the scanned characters is then compiled such that each character is placed in a position within a table associated with an appropriate "made-up" font. The compiled sequence of characters are thus arranged in an encryption/decryption table. The resulting sequence (i.e., the table) is packed along with the made-up bit-mapped fonts and sent to the browser located at a local network site, as illustrated at block 150. The encryption/decryption table and the encrypted data (i.e., the made-up bit-mapped fonts) are both transferred to the browser. This table contains a mapping of all unique characters or symbols and their associated key values.

The data to be encrypted is encrypted as a sequence of keys. During display at the browser end, table look-up will consist of reading the sequence of keys (i.e., the encrypted data) and displaying the "made-up" font associated with that key. As indicated at block 152, the browser unpacks the bit-mapped font and as depicted at block 154, is instructed to convert the sequence of bit-mapped fonts back to the original foreign characters as shown at block 156, displayed as bit-mapped fonts on the new browser window, as illustrated at block 158.

Those skilled in the art will appreciate that as described herein, a pseudo-encryption method and system are presented which provides an encryption of foreign characters. This encryption is translated into bit mapped fonts which are displayed via browsers which do not normally support the display of such foreign language characters. The decrypted data is merely displayed in the browser without altering the current locale within the browser.

For instance, Arabic characters can be decrypted and displayed in a browser that is currently to the "English" language locale. An example of a current "English" language locale is evident in Netscape™. The Netscape™ browser includes an "Options" menu, which further includes a "General Preferences" menu. Within "General Preferences" is a "Language" setting. Despite an English language setting, the browser can still display the Arabic characters utilizing the method and system described herein.

Those skilled in the art will further appreciate that the method and system described herein is free of all standards. The displayed home page can provide its own standards and the browser need not be aware of these standards. Also, more than one language can be supported by this method and system, including "made up" languages. Mathematical formulas and characters can also be supported by this method and system, as if such formulas and characters were foreign or "unknown" characters, simply because encryption is possible by definition. The method and system described herein thus does not provide full NLS support, but does offer a solution that provides an encryption/decryption technique that is directly coupled with the encrypted data.

While the invention has been particularly shown as described with reference to a preferred embodiment, it will be understood by those skilled in the art that various changes in form and detail may be made therein without departing from the spirit and scope of the invention. Utilization of the Internet in association with the method and system described herein is not a necessary feature of the present invention. For example, the present invention is applicable to other communication networks besides the Internet, including so-called "intranets" (i.e., networks that are internal to particular organizations). The Internet, as described herein, is merely one example of a remote network that can be utilized in accordance with a preferred embodiment of the present invention. It is therefore contemplated that such modifications can be made without departing from the spirit or scope of the present invention as defined in the appended claims.

What is claimed is:

1. A method in a collaborative data processing system for enabling a client to display text from a server in a non-native font, said method comprising:

receiving, at a server utilizing a first character set, a message from a client utilizing a second character set, said message requesting data to be displayed within said client;

in response to receipt of said message, identifying characters from said first character set that are contained in said data, and building a font table that includes character images for said identified characters;

transmitting said font table and said data, including said identified characters, to said client, such that said client accepts said font table as a supplemental character set; and processes said identified characters as text, utilizing said character images from said font table to display said identified characters.

2. A method according to claim 1, wherein:

said step of building said font table comprises adding bit-maps of characters from a first language to said font table; and said second character set includes characters from a second language.

3. A method according to claim 2, wherein:

said server is a Web server; and said method further comprises:
 receiving said data and said font table at said client;
 loading said font table into a Web browser executing in said client; and
 displaying said identified characters as text within said Web browser.

4. A method according to claim 2, further comprising:

building a sequence table that lists said identified characters and includes one or more sequence indexes for at least one of said identified characters; and wherein:

said step of transmitting said data and said font table to said client comprises transmitting said sequence table to said client.

5. A server in a collaborative data processing environment with facilities for enabling a client to display text from the server in a non-native font, said server comprising:

a first character set that is utilized by said server;

in input facility that receives a message from a client utilizing a second character set, said message requesting data to be displayed within said client;

a font table builder that responds to receipt of said message by identifying any characters from said first character set that are contained in said data and building a font table that includes character images for said identified characters; and an output facility that transmits said font table and said data, including said characters, to said client, such that said client accepts said font table as a supplemental character set and processes said identified characters as text, utilizing said character images from said font table to display said identified characters.

6. A server according to claim 5, wherein:

said character images in said font table are bit-maps of characters from a first language; and said second character set includes characters from a second language.

7. A server according to claim 6, wherein said server is a Web server.

8. A server according to claim 6, further comprising:

a sequence table builder which builds a sequence table that lists said identified characters and includes one or more sequence indexes for at least one of said identified characters; and wherein:

said output facility transmits at least part of said data to said client within said sequence table.

9. A program product with facilities for enabling text from a server to be displayed by a client in a non-native font, said program product comprising:

in input facility that receives, at a server utilizing a first character set, a message from a client utilizing a second character set, said message requesting data to be displayed within said client;

a font table builder that responds to receipt of said message by identifying any characters from said first character set that are contained in said data and building a font table that includes character images for said identified characters;

an output facility that transmits said font table and said data, including said identified characters, to said client, such that said client accepts said font table as a supplemental character set and processes said identified characters as text, utilizing said character images from said font table to display said identified characters; and a computer usable medium encoding said input facility, said font table builder, and said output facility.

10. A program product according to claim 9, wherein:

said character images in said font table are bit-maps of characters from a first language; and said second character set includes characters from a second language.

11. A program product according to claim 10, wherein:

said computer usable medium further encodes a sequence table builder which builds a sequence table that lists said identified characters and includes one or more sequence indexes for at least one of said identified characters; and said output facility transmits at least part of said data to said client within said sequence table.

* * * * *